United States Patent [19]

Yoshida et al.

[11] Patent Number: 4,786,490

[45] Date of Patent: Nov. 22, 1988

[54] PROCESS AND APPARATUS FOR PRODUCING HIGH PURITY MAGNESIUM OXIDE FINE PARTICLES

[75] Inventors: Kozaburo Yoshida; Akio Nishida; Toru Adachi, all of Ube, Japan

[73] Assignee: UBE Industries, Ltd., Yamaguchi, Japan

[21] Appl. No.: 921,489

[22] Filed: Oct. 22, 1986

[30] Foreign Application Priority Data

Oct. 29, 1985 [JP] Japan .................. 60-243612

[51] Int. Cl.$^4$ .......................................... C01B 33/18
[52] U.S. Cl. ..................... 423/636; 422/158
[58] Field of Search ................ 423/636; 422/158

[56] References Cited

U.S. PATENT DOCUMENTS

| | | |
|---|---|---|
| 2,331,599 | 10/1943 | Cyr .......................................... 423/623 |
| 2,823,982 | 2/1958 | Saladin et al. ..................... 422/158 |
| 3,069,281 | 12/1962 | Wilson ................................. 422/158 |
| 3,512,219 | 5/1970 | Stern et al. ........................ 422/158 |
| 4,160,526 | 7/1979 | Flanagan . |
| 4,206,176 | 6/1980 | Vanderveen ..................... 422/158 |
| 4,473,185 | 9/1984 | Peterson et al. . |

FOREIGN PATENT DOCUMENTS

| | | |
|---|---|---|
| 139208 | 12/1970 | Czechoslovakia . |
| 0087798 | 9/1983 | European Pat. Off. . |
| 1241809 | 6/1967 | Fed. Rep. of Germany . |
| 3421842A1 | 11/1984 | Fed. Rep. of Germany . |
| 1361533 | 3/1972 | United Kingdom . |
| 1426159 | 5/1974 | United Kingdom . |
| 2141701 A | 5/1984 | United Kingdom . |

OTHER PUBLICATIONS

Takanori Watari et al., Journal of Japanese Chemical Society, No. 6, pages 1075 and 1076 (1984).

*Primary Examiner*—John Doll
*Assistant Examiner*—Wayne A. Langel
*Attorney, Agent, or Firm*—Finnegan, Henderson, Farabow, Garrett & Dunner

[57] ABSTRACT

High purity magnesium oxide fine particles are produced by introducing a flow of a magnesium vapor-containing gas and a flow of an inert gas separately into a mixing region to provide a flow of a mixture gas; by introducing the flow of the mixture gas into an oxidizing region while a flow of a molecular oxygen-containing gas is introduced into the oxidizing region concurrently with the flow of the mixture gas; to provide a flow of a reaction mixture in which the magnesium vapor is oxidized, by introducing the flow of the reaction mixture containing the resultant magnesium oxide fine particles into a collecting region; and, by collecting the magnesium oxide particles from the reaction mixture by, for example, a filter located in the collecting region.

17 Claims, 2 Drawing Sheets

PROCESS AND APPARATUS FOR PRODUCING HIGH PURITY MAGNESIUM OXIDE FINE PARTICLES

BACKGROUND OF THE INVENTION

1. Field of the Invention

The present invention relates to a process and apparatus for producing high purity magnesium oxide fine particles by means of a gas phase oxidizing reaction.

2. Description of the Related Art

It is well known that fine particles of varioss metal oxides, for example, magnesium oxide and calcium oxide, exhibit excellent heat resistance and electrical insulating property and, therefore, are highly useful as ceramic materials, catalysts, pigments, or fillers in a wide range of industries. Especially, it was recently discovered that very fine metal oxide particles having a very small size of 0.1 $\mu$m or less exhibit various unique properties different from those of coarse metal oxide particles. For example, very fine metal oxide particles exhibit excellent chemical reactivity due to their large total surface area and the high surface energy of the particles. Also, very fine metal oxide particles exhibit different magnetic and optical properties from those of usual metal oxide particles in the form of a bulk due to the very small volume of the individual particles.

The above-mentioned specific properties open up new fields of application for very fine metal oxide particles, for example, starting materials for catalysts, sintered materials, porous materials, sensor materials, magnetic materials, and pigments.

In particular, magnesium oxide fine particles are useful as starting materials of sintered materials and as sensor materials. Accordingly, there is a strong demand for the provision of high purity magnesium oxide fine particles.

It is known that the fine metal oxide particles can be produced by various methods including liquid phase reaction methods and gas phase reaction methods.

Particularly, in the gas phase reaction method, it is believed that very fine metal oxide particles can be produced by carrying out the metal oxide-forming reaction under appropriate conditions at a high efficiency, because in this method the resultant fine metal oxide particles do not easily agglomerate, the formation of secondary agglomerates is very small, and the reaction conditions can be easily decided.

Accordingly, there are various approaches to new gas phase reaction methods for producing high purity magnesium oxide particles.

The gas phase reaction methods can be classified into a first method, wherein metal vapor is brought into contact with an oxygen-containing gas at a temperature at which the metal vapor can be oxidized into fine metal oxide particles, and a second method, wherein metal oxide particles are produced in a combustion flame generated by the combustion of a corresponding metal substance which is capable of being oxidized.

In the first gas phase reaction method, for example, metallic magnesium is heated within an inert gas atmosphere to generate magnesium vapor, the magnesium vapor is allowed to flow into an oxidizing region, and a flow of a molecular oxygen-containing gas is introduced into the oxidizing region countercurrently to the flow of the magnesium vapor, to allow the magnesium vapor to come into contact and react with the molecular oxygen-containing gas. This method for producing fine magnesium oxide particles having a high purity is disclosed in Czechoslovakian Patent No. 139,208.

Also, Takanori Watari, Kazumi Nakayoshi and Akio Kato, Journal of Japanese Chemical Society, No. 6, pages 1075 to 1076 (1984), disclose a method for producing fine magnesium oxide particles in which metallic magnesium is heated and the resultant magnesium vapor is introduced together with argon gas into a reactor and is mixed with an oxygen ($O_2$) - nitrogen ($N_2$) mixture gas.

The above specifically mentioned methods are, however, disadvantageous in that, when magnesium vapor is fed into an oxidizing region through a front open end of a nozzle, a portion of the fed magnesium vapor is oxidized around the front open end of the nozzle and the resultant magnesium oxide particles deposit on and block the front open end of the nozzle. Because of this phenomenon, the oxidizing operation can not be carried out continuously over a long period of time. That is, the oxidizing operation must be interrupted to remove the deposits of magnesium particles from the front open end of the nozzle. Another disadvantage of the above-mentioned conventional methods is that, since the oxidizing operation is carried out at a high temperature of 800° C. to 1600° C., the deposited magnesium oxide is sintered on the front open end of the nozzle. This phenomenon results in a significant decrease in the yield of resultant non-sintered magnesium oxide particles.

Also, in the conventional methods, in order to produce very fine magnesium oxide particles having a very small size, it is usually necessary to dilute the magnesium vapor with a large amount of an inert gas and then bring the diluted magnesium vapor-containing gas into contact with a molecular oxygen-containing gas. The magnesium vapor is generated by melting and then vaporizing metal magnesium at an elevated temperature, and is then diluted by the inert gas in a diluting region. If the inert gas contains impurities, for example, oxygen and nitrogen, which are reactive with the magnesium vapor, the impurities will react with the magnesium vapor and the resultant magnesium compounds be deposited in the diluting region. Therefore, it is necessary to remove the reactive impurities from the inert gas. This necessity incurs a very complicated and expensive production process and apparatus, and a very high production cost of the resultant magnesium oxide fine particles.

SUMMARY OF THE INVENTION

An object of the present invention is to provide a process and apparatus for producing high purity magnesium oxide particles having a very small and uniform size.

Another object of the present invention is to provide a process and apparatus for producing high purity magnesium oxide fine particles at a high efficiency by means of a gas phase oxidation reaction on an industrial scale.

Still another object of the present invention is to provide a process and apparatus for continuously producing high purity magnesium oxide fine particles, which process and apparatus are highly effective for preventing undesirable deposition of the resultant magnesium oxide particles on a front open end of a nozzle for feeding magnesium vapor and subsequent undesirable blocking of the front open end of the nozzle with the deposited magnesium oxide particles.

The above-mentioned object can be attained by the process and apparatus of the present invention.

The process of the present invention comprises the steps of: introducing a flow of magnesium vapor-containing gas into a mixing region through a magnesium vapor-feeding nozzle; introducing a flow of an inert gas into the mixing region through an inert gas-feeding nozzle, to provide a flow of a mixture gas consisting of the magnesium vapor-containing gas and the inert gas; introducing the flow of the mixture gas from the mixing region into an oxidizing region; flowing a molecular oxygen-containing gas concurrently with the flow of the mixture gas into the oxidizing region through a molecular oxygen-containing gas-feeding nozzle, to provide a flow of a reaction mixture in which the molecular oxygen-containing gas comes into contact with and oxidizes the magnesium vapor to produce high purity magnesium oxide fine particles in the oxidizing region; introducing the flow of the reaction mixture containing the resultant magnesium oxide fine particles into a magnesium oxide particle-collecting region; and collecting the magnesium oxide particles from the reaction mixture in the collecting region.

The apparatus of the present invention comprises (A) a nozzle for feeding a magnesium vapor-containing gas, having a front open end thereof and a rear end thereof connected to a supply source of the magnesium vapor-containing gas; (B) a nozzle for feeding an inert gas, having a front open end thereof and a rear end thereof connected to a supply source of tee inert gas; (C) a mixing tube for mixing the magnesium vapor-containing gas with the inert gas therein, having a front open end thereof and a rear end thereof, into which rear end the front open ends of the magnesium vapor-containing gas-feeding nozzle and the inert gas-feeding nozzle are inserted, and extending over the front open ends of the magnesium vapor-containing gas-feeding nozzle and the inert gas-feeding nozzle in a concentric circular relationship to the magnesium vapor-containing gas-feeding nozzle; (D) an oxidizing tube for oxidizing the magnesium vapor therein, having a front open end and a rear end thereof, into which rear end the front open end of the mixing tube is inserted, and extending over the front open end of the mixing tube and in a concentric circular relationship to the mixing tube; (E) a nozzle for feeding a molecular oxygen-containing gas, formed between the inserted front end portion of the mixing tube and the rear end portion of the oxidizing tube and having a front open end thereof opening to the oxidizing tube and a rear end thereof connected to a supply source of the molecular oxygen-connected containing gas; and (F) means for collecting the resultant magnesium oxide particles, connected to the front open end of the oxidizing tube.

In the process and apparatus of the present invention, it is important that the magnesium vapor-containing gas is mixed with the inert gas in the mixing region defined by the mixing tube and located between the magnesium vapor-containing gas-feeding nozzle and the oxidizing tube defining the oxidizing region.

The mixing region defined by the mixing tube is effective for diluting the magnesium vapor with the inert gas while preventing direct contact of the magnesium vapor with the molecular oxygen-containing gas. The resultant mixture gas containing the diluted magnesium vapor is effective for decreasing the growth rate of the resultant magnesium oxide particles when the mixture gas is allowed to flow into the oxidizing region defined by the oxidizing tube.

The mixing region is also effective for preventing undesirable deposits of magnesium oxide particles on the front open end of the magnesium vapor-containing gasfeeding nozzle and subsequent undesirable blocking of the front open end by the deposited magnesium oxide particles.

DESCRIPTION OF THE PREFERRED EMBODIMENTS

Figure 1:
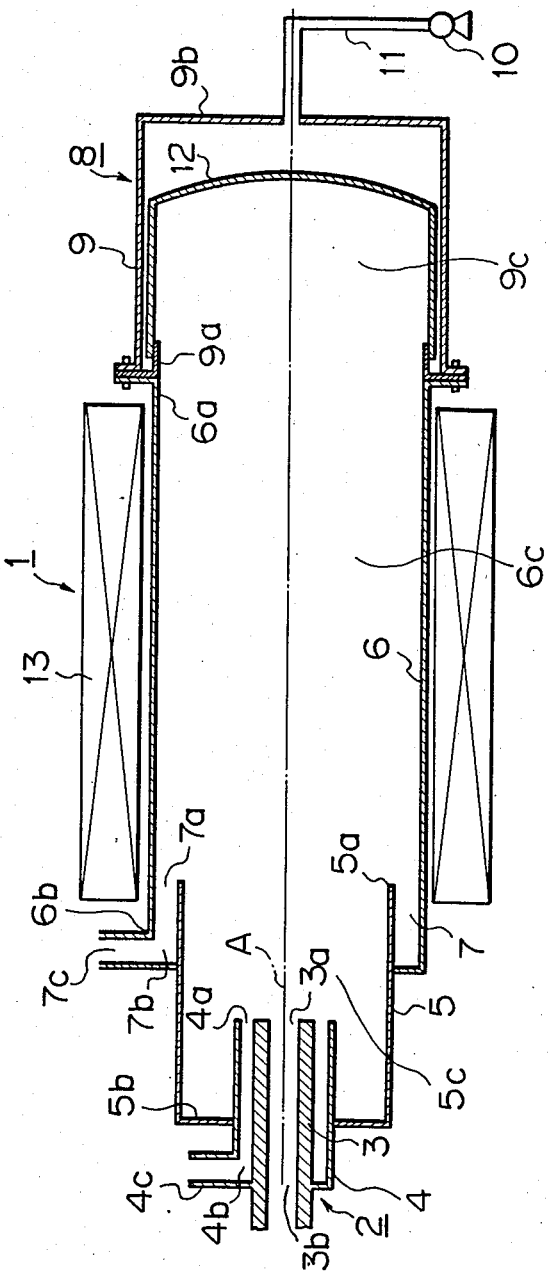
FIG. 1 is an explanatory cross-sectional view of an embodiment of the apparatus of the present invention; and, FIG. 2 is an explanatory cross-sectional view of a portion of another embodiment of the apparatus of the present invention, which portion includes a core-in-sheath type composite nozzle for a magnesium vapor-containing gas and an inert gas, a mixing tube, an oxidizing tube, and a molecular oxygen-containing gas-feeding nozzle.

In the process of the present invention, a flow of magnesium vapor-containing gas is introduced or injected into a mixing region through a magnesium vapor-containing gas-feeding nozzle, and separately, a flow of an inert gas is introduced or injected into the mixing region through a separate inert gas-feeding nozzle, to provide a flow of a mixture gas consisting of the magnesium vapor-containing gas and the inert gas mixed together in the mixing region. In the above-mentioned operations, a front open end of the magnesium vapor-containing gas-feeding nozzle is exposed only to the mixture gas, which is free from molecular oxygen.

The flow of the mixture gas is introduced from the mixing region into an oxidizing region, and separately, a flow of a molecular oxgen-containing gas is introduced through a molecular oxygen-containing gas-feeding nozzle into the oxidizing region concurrently with the flow of the mixture gas. In this oxidizing region, the mixture gas is admixed with the molecular oxygen-containing gas to provide a reaction mixture. In this reaction mixture, molecular oxygen comes into contact with and oxidizes the magnesium vapor, to produce high purity magnesium oxide fine particles.

The flow of the reaction mixture containing the resultant magnesium oxide particles is introduced into a region for collecting the magnesium oxide particles.

In the magnesium oxide particle-collecting region, the magnesium oxide particles are separated and collected from the reaction mixture.

The magnesium vapor can be generated by any known methods. Usually, the magnesium vapor is generated in accordance with the method disclosed in Japanese Unexamined Patent Publication (Kokai) No. 60-161327, by heating metal magnesium contained in a retort at a metal magnesium boiling temperature or higher. This generation of the magnesium vapor can be effected in an inert gas atmosphere or while flowing an inert gas over the retort. In tee generation of the magnesium vapor in the presence of the inert gas, preferably the inert gas is free from impurities reactive with the magnesium vapor, or the inert gas is used in as small an amount as possible. The magnesium vapor-containing gas may consist of magnesium vapor alone.

The inert gas usable for the present invention preferably consists of at least one member selected from a group consisting of helium, neon, argon, krypton, xenon, and radon.

Nitrogen is reactive with a magnesium melt, but not reactive with a magnesium vapor, at a high temperature. Therefore, nitrogen can be used as an inert gas for the present invention. When the nitrogen gas is used, however, the gas should be preliminarily heated to a temperature high enough to prevent undesirable condensation of the magnesium vapor.

When the magnesium vapor is mixed with the inert gas in the mixing region, preferably the content of the magnesium vapor in the resultant mixture gas is 10 molar % or less, more preferably 5 molar % or less.

Preferably the magnesium vapor-containing gas and the inert gas are fed in a core-in-sheath type flow relationship in which a core flow consisting of the magnesium vapor-containing gas is surrounded by a sheath flow consisting of the inert gas. The core-in-sheath type flow is formed by a core-in-sheath type composite nozzle in which a core nozzle consisting of the magnesium vapor-containing gas-feeding nozzle is surrounded in a concentric circular relationship by a sheath nozzle consisting of the inert gas-feeding nozzle.

The core-in-sheath type composite flow is effective for protecting a front end of the magnesium vapor-containing gas-feeding nozzle with the flow of the inert gas, so that undesirable deposits of magnesium oxide particles on the front end of the nozzle are prevented.

The flow of the magnesium vapor-containing gas can be fed concurrently with the flow of the inert gas into the mixing region. In this case, the direction of the flow of the magnesium vapor-containing gas is parallel to that of the inert gas, and the magnesium vapor-containing gas is gradually mixed with the inert gas in the mixing region.

Alternatively, the flow of the inert gas is fed in a direction at angles $\theta$ of 60 degrees or less to that of the magnesium vapor-containing gas, to rapidly mix the magnesium vapor-containing gas with the inert gas while forming a turbulent flow of the mixture gas in the mixing region. This turbulent flow of the mixture gas is highly effective for hindering undesirable penetration of the molecular oxygen-containing gas from the oxidizing region into a region around the front open end of the magnesium vapor-containing gas-feeding nozzle.

When the flow of the inert gas is fed into the mixing region in a direction parallel to that of the magnesium vapor-containing gas, in order to promote the mixing of the inert gas with the magnesium vapor-containing gas, preferably the flow velocity of the inert gas and the flow velocity of the magnesium vapor-containing gas are in a ratio of 1:1 or more, more preferably, 2:1 to 10:1.

Also, when the flow of the inert gas intersects the flow of the magnesium vapor-containing gas at an angle $\theta$ of 60 degrees, to promote a uniform mixing of the inert gas with the magnesium vapor-containing gas, preferably the ratio of the flow velocity of the inert gas to that of the magnesium vapor-containing gas is 0.5:1 or more, more preferably, in the range of from 1:1 to 5:1.

When the intersecting angle $\theta$ is more than 0 degree but less than 60 degrees, the flow velocity ratio of the inert gas to that of the magnesium vapor-containing gas can be determined by taking into consideration the above mentioned values of the flow velocity ratio, preferably at a level of more than 0.5:1 but less than 10:1.

In the process of the present invention, the molecular oxygen-containing gas usually consists of, but is not limited to, air. That is, the molecular oxygen-containing gas may consist of oxygen alone or a mixture of oxygen gas with an inert gas.

When the flow of the mixture gas and the flow of the molecular oxygen-containing gas are introduced into the oxidizing region and are admixed to provide a reaction mixture, the molecular oxygen comes into contact with and oxidizes the magnesium vapor, to generate magnesium oxide particles. In this oxidizing reaction, the resultant magnesium oxide particles grow very slowly, since the content (partial pressure) of the magnesium vapor in the reaction mixture is small. The reaction region is heated at a temperature of 800° C. to 1600° C.

The reaction mixture containing the resultant magnesium oxide particle flows from the mixing region into a region for collecting the particles. In the collection region, the magnesium oxide particles are separated and collected from the reaction mixture by, for example, filtration.

The above-mentioned process can be effected by the apparatus of the present invention, as described below.

Referring to FIG. 1, a magnesium oxide particle-producing apparatus 1 comprises a nozzle 3 for feeding a magnesium vapor-containing gas and a nozzle 4 for feeding an inert gas, a mixing tube 5 defining a mixing region for mixing the magnesium vapor-containing gas with the inert gas, an oxidizing tube 6 defining an oxidizing region 6a for oxidizing the magnesium vapor with a molecular oxygen-containing gas to produce magnesium oxide fine particles, a nozzle 7 for feeding the molecular oxygen-containing gas into the oxidizing tube 6, and means 8 for collecting the resultant magnesium oxide particles.

Figure 2:
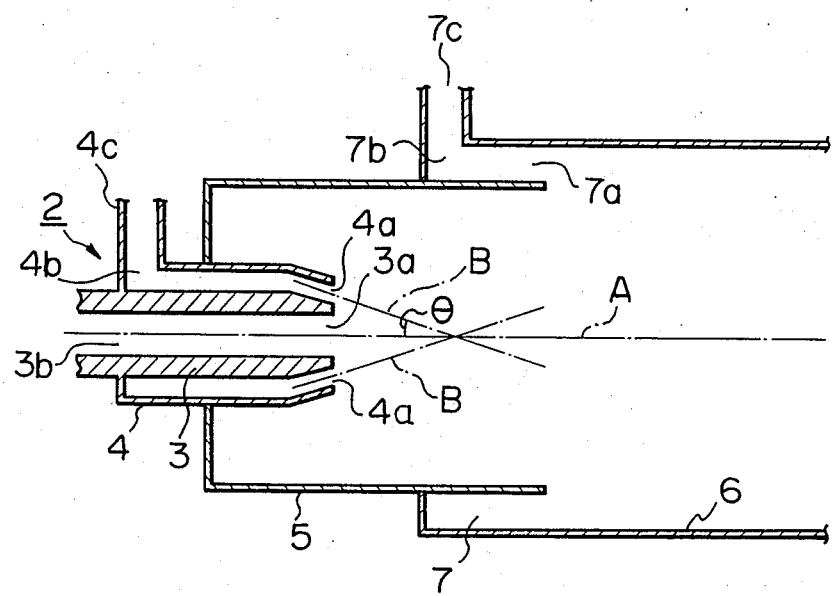

Preferably the magnesium vapor-containing gas-feeding nozzle 3 and the inert gas-feeding nozzle 4 are formed as a core-in-sheath type composite nozzle 2 as shown in FIGS. 1 and 2, in which a core nozzle consisting of the magnesium vapor-containing gas-feeding nozzle 3 is surrounded in a concentric circular relationship by a sheath nozzle consisting of the inert gas-feeding nozzle 4.

As shown in detail in FIG. 2, the core nozzle 3 extends along a horizontal longitudinal axis A of the apparatus and has a front open end 3a and a rear end 3b thereof connected to a supply source of the magnesium vapor-containing gas (not shown in the drawing). In the magnesium vapor-containing gas supply source, metal magnesium contained in a retort is heated at a temperature higher than the boiling point of magnesium, and the resultant magnesium vapor is supplied to the core nozzle 3 through the rear end 3b of the core nozzle 3. The magnesium vapor may be mixed with an inert gas in the supply source (not shown) to prepare a magnesium vapor-containing gas. The magnesium vapor-containing gas is fed into the mixing tube 5 through the front open end 3a of the core nozzle 3.

The sheath nozzle 4 for feeding an inert gas into the mixing tube 5 extends in a concentric circular relationship to the core nozzle 3 and has a front open end 4a and a rear end 4b thereof connected to a supply source (not shown in the drawing) of the inert gas through a conduit 4c.

The mixing tube 5 defines a mixing region for mixing the magnesium vapor-containing gas with the inert gas therein. The mixing tube 5 has a larger diameter than that of the composite nozzle 2, extends in a concentric circular relationship to the composite nozzle 2 over the front open ends 3a and 4a of the core nozzle 3 and sheath nozzle 4 and has a front open end 5a and a rear end 5b thereof. The front open ends 3a and 4a of the core and sheath nozzles 3 and 4, respectively, are inserted into the mixing tube 5 through the rear end 5b of the mixing tube 5.

The oxidizing tube 6 defines an oxidizing region for oxidizing therein the magnesium vapor with the molecular oxygen-containing gas. The oxidizing tube 6 has a larger diameter than that of the mixing tube 5 and extends over the front open end portion of the mixing tube 5 in a concentric circular relationship thereto, and has a front open end 6a and a rear end 6b thereof, through which rear end 6b the front open end 5a of the mixing tube 5 is inserted into the oxidizing tube 6.

The nozzle 7 for feeding the molecular oxygen-containing gas into the oxidizing tube 6 is formed between the inserted front end portion 5a of the mixing tube 5 and the rear end portion 6b of the oxidizing tube 6 in a concentric circular relationship to the mixing tube 5. The nozzle 7 has a front open end 7a, and a rear end 7b thereof is connected to a molecular oxygen-containing gas supply source (not shown in the drawing) through a conduit 7c.

The composite nozzle 2, the mixing tube 5, and the oxidizing tube 6 are made of a refractory material, for example, porcelain.

The collecting means 8 comprises a collecting box 9 having a front open end 9a thereof removably connected to the front open end 6a of the oxidizing tube 6 and a rear closed end 9b thereof connected to a vacuum pump 10 through a conduit 11. The collecting box 9 defines a region 9c for separating and collecting the resultant magnesium oxide particles from the reaction mixture and contains therein a separating means, for example, a filter 12.

The oxidizing tube 6 is surrounded by a means for heating the tube 6, for example, an electric furnace 13.

When a flow of the reaction mixture containing the resultant magnesium oxide particles is made to flow from the oxidizing tube 6 into the collecting box 9, the magnesium oxide particles are separated and collected from the reaction mixture by the filter 12, and the residual gas is discharged from the collecting box 9 through the conduit 11 by the vacuum pump 10.

In the composite nozzle 2 indicated in FIG. 1, the sheath nozzle 4 has an inert gas-feeding direction parallel to the magnesium vapor-containing gas-feeding direction of the core nozzle 3.

Alternatively, in the composite nozzle indicated in FIG. 2, the sheath nozzle 4 has an inclined front open end 4a thereof through which an inert gas is fed in a direction B which intersects the longitudinal axis A of the core nozzle 3 at an angle $\theta$. Accordingly, the flow of inert gas intersects the flow of magnesium vapor-containing gas fed along the longitudinal axis A through the front open end of the core nozzle 3, at the angle $\theta$. The intersecting angle $\theta$ is preferably in the range of from 0 to 60 degrees.

The high purity magnesium oxide fine particles produced by the process of the present invention have a high chemical activity, and if allowed to come in contact with air, the magnesium oxide fine particles tend to absorb carbon dioxide and water vapor from the air. In order to protect the resultant high purity magnesium oxide fine particles from contact with the air, preferably the magnesium oxide particle-collecting region 9c is completely shielded from the air, i.e., made airtight, by the collecting box 9.

Usually, the magnesium vapor oxidation reaction is carried out under an ambient pressure or a reduced pressure. The pressure in the oxidizing tube 6 is maintained at a desired level by the vacuum pump 10.

The collecting box 9 is removably connected to the oxidizing tube 6, as indicated in FIG. 1. After the magnesium vapor oxidation procedure is completed, the collecting box 9 is removed from the oxidizing tube 6 and the resultant magnesium oxide fine particles collected on the filter 12 are recovered.

The high purity magnesium oxide fine particles produced in accordance with the process and apparatus of the present invention have a size of 0.03 $\mu$m or less, usually, 0.015 $\mu$m or less, calculated from a specific surface area determined by means of the adsorption of nitrogen in accordance with the Brunauer, Emmett and Teller's method (BET method), and are in the form of cubic periclase crystals. The fine particles contain substantially no agglomerates. Accordingly, the high purity magnesium oxide fine particles of the present invention can be easily converted to a shaped body and then to a sintered body having a very high density.

Also, since a pulverizing procedure for the magnesium oxide fine particles is not necessary, the magnesium oxide fine particles are not contaminated by the impurities usually included during the pulverizing procedure.

The magnesium oxide fine particles of the present invention have a high degree of purity of 99.9% or more, which is about the same as the purity of the metallic magnesium used.

The high purity magnesium oxide fine particles of the present invention exhibit a highly improved sintering property without the use of an additive or without surface-treating. Therefore, the magnesium oxide fine particles can be easily converted to a sintered magnesium body having a high density of, for example, 3.51 or more, at a relatively low sintering temperature level of, for example, 1300° C.

Accordingly, the high purity magnesium oxide fine particles produced in accordance with the present invention are useful as a new ceramic material for producing high-quality porcelain products, electrical insulators, heat resistant transparent products, and infrared transmitting products.

The present invention will be illustrated in detail by the following non-limiting examples and comparative example.

EXAMPLE 1

An apparatus as shown in FIG. 1 was used to produce high purity magnesium oxide fine particles.

In the apparatus, the core-in-sheath type composite nozzle comprised a core nozzle defined by a core tube having an inside diameter of 4 mm and an outside diameter of 10 mm and a sheath nozzle formed between the core tube and a sheath tube having an inside diameter of 20 mm and an outside diameter of 26 mm. The intersecting angle $\theta$ was zero. The mixing tube had an inside diameter of 54 mm, an outside diameter of 60 mm and a length of 140 mm.

The oxidizing tube had an inside diameter of 70 mm, an outside diameter of 76 mm and a length of 400 mm.

As a supply source of the magnesium vapor-containing gas (not shown in the drawing), metal magnesium was heated in a retort at a temperature of 1200° C. to generate magnesium vapor at a generating rate of 1.2 g/min. The magnesium vapor was fed at a flow velocity of 7.6 m/sec. into the mixing region defined by the mixing tube through the core nozzle.

An inert gas consisting of argon gas having a degree of purity of 99.99% was fed into the mixing region through the sheath nozzle at a flow velocity of 12 m/sec, and was mixed with the magnesium vapor in the mixing region. In the resultant mixture gas in the mixing region, the molar ratio [Mg]/[Ar] of the content of magnesium vapor [Mg] to the content of argon [Ar] was regulated to a level of 0.033.

Air was injected into the oxidizing region defined by the oxidizing tube through the molecular oxygen-containing gas-feeding nozzle at a feeding rate of 800 Nl/min. The temperature of the oxidizing region was maintained at a level of 1200° C.

The resultant magnesium oxide fine particles were separated from the reaction mixture by means of a filter in a collecting box.

The magnesium oxide fine particles had an average size (BET particle size) of 0.026 μm. After the above-mentioned procedures were carried out for 24 hours, it was found that the amount of magnesium oxide particles deposited on the front end portion of the core nozzle corresponded to 0.3% of the entire weight of the resultant magnesium oxide particles.

The size of the magnesium oxide particles was determined in accordance with a nitrogen-absorption method from the following equation:

BET particle size $= a/(s \times \rho)$ wherein s represents a specific surface area of the particles, a represents a particle configuration factor having a value of 6, and $\rho$ represents a particle density having a value of 3.58 g/cm$^3$.

EXAMPLE 2

The same procedures as those described in Example 1 were carried out except that the inert gas consisting of argon gas was fed at a flow velocity of 20 m/sec into the mixing region through the sheath nozzle and the molar ratio [Mg]/[Ar] in the mixing region was regulated to a level of 0.018.

The resultant magnesium oxide fine particles had an average size of 0.014 μm. It was found that the amount of magnesium oxide particles deposited on the front end portion of the core nozzle during 24 hours of the oxidizing procedure was only 0.2% based on the entire weight of the resultant magnesium oxide particles.

EXAMPLE 3

The same procedures as those described in Example 1 were carried out except that the core-in-sheath type composite nozzle indicated in FIG. 1 was replaced by that of the type indicated in FIG. 2, wherein the intersecting angle θ was 60 degrees, the molar ratio [Mg]/[Ar] was regulated to 0.051, and the flow velocity of the inert gas was 7 m/sec.

The resultant magnesium oxide particles had an average size of 0.031 μm. The amount of the magnesium oxide particles deposited on the front open end of the core nozzle was 0.8% based on the entire weight of the resultant magnesium oxide particles.

EXAMPLE 4

The same procedures as those described in Example 3 were carried out except that the molar ratio [Mg]/[Ar] was 0.033 and the flow velocity of the inert gas consisting of argon gas was 12 m/sec.

The resultant magnesium oxide particles had an average size of 0.023 μm. A portion of the resultant magnesium oxide particles was deposited in an amount of 0.6% based on the entire weight of the resultant magnesium oxide particles on the front open end of the core nozzle.

EXAMPLE 5

The same procedures as those described in Example 3 were carried out except that the molar ratio [Mg]/[Ar] was 0.018 and the flow velocity of the inert gas consisting of argon gas was 20 m/sec.

The resultant magnesium oxide particles had an average size of 0.012 μm. The amount of the magnesium oxide particles deposited on the front open end of the core nozzle was 0.4% based on the entire weight of the resultant magnesium oxide particles.

COMPARATIVE EXAMPLE 1

The same procedures as those described in Example 1 were carried out, with the following exception.

In the supply source of the magnesium vapor, the magnesium was mixed with argon gas having a degree of purity of 99.9% and introduced at a flow rate of 33.9 Nl/min into the supply source to provide a mixed gas having a molar ratio [Mg]/Ar] of 0.033. The mixed gas was fed at a flow velocity of 20 m/sec into the mixing tube through the core nozzle. An inert gas was not fed through the sheath nozzle into the mixing tube. That is, the front open end of the core nozzle was not protected by a flow of the inert gas.

The resultant magnesium oxide particles had an average size of 0.020 μm. The amount of the magnesium oxide particles deposited on the front open end of the core nozzle was 6.3% based on the entire weight of the resultant magnesium oxide particles. After the magnesium oxide particle-producing procedure was continued for a considerable short time of 30 minutes, it was found that the front open end of the core nozzle was blocked by the deposited magnesium oxide particles.

Also, it was found that, since the argon gas used contained a small amount of oxygen and nitrogen, considerable amounts of magnesium oxide and magnesium nitride (Mg$_3$N$_2$) were deposited on the retort in the supply source of the magnesium vapor.

COMPARATIVE EXAMPLE 2

The same procedures as those described in Example 1 were carried out except that air was introduced into the mixing tube through an air nozzle formed in the rear end of the mixing tube.

The resultant magnesium oxide particles had an average size of 0.015 μm. The amount of the magnesium oxide particles deposited on the front open end of the core nozzle during the procedure in a short time period of 12 minutes was 10.5% based on the entire weight of the resultant magnesium oxide particles.

We claim:
1. A process for producing high purity magnesium oxide fine particles, comprising the steps of:
   introducing a flow of a magnesium vapor-containing gas into a mixing region through a magnesium vapor-containing gas-feeding nozzle;
   introducing a flow of an inert gas into said mixing region through an inert gas-feeding nozzle to pro- vide a flow of a mixture gas consisting of said magnesium vapor-containing gas and said inert gas;

introducing said flow of said mixture gas from said mixing region into an oxidizing region;

flowing a molecular oxygen-containing gas concurrently with said flow of said mixture gas into said oxidizing region through a molecular oxygen-containing gas-feeding nozzle, to provide a flow of a reaction mixture in which molecular oxygen comes into contact with and oxidizes said magnesium vapor into high purity magnesium oxide fine particles in said oxidizing region;

introducing said flow of said reaction mixture containing said resultant magnesium oxide fine particles into a magnesium oxide particle-collecting region; and collecting said magnesium oxide particles from said reaction mixture in said collecting region.

2. The process as claimed in claim 1, wherein a content of said magnesium vapor in said mixture gas in said mixing region is 10 molar % or less.

3. The process as claimed in claim 2, wherein said content of said magnesium vapor in said mixture gas is in a range of 5 molar % or less.

4. The process as claimed in claim 1, wherein flows of said magnesium vapor-containing gas and said inert gas are fed in a core-in-sheath relationship in which a core flow of said magnesium vapor-containing gas is surrounded by a sheath flow of said inert gas.

5. The process as claimed in claim 1, wherein said flow of said inert gas is parallel to said flow of said magnesium vapor-containing gas.

6. The process as claimed in claim 1, wherein a flow velocity ratio of said flow of said inert gas to said flow of said magnesium vapor-containing gas is 1:1 or more.

7. The process as claimed in claim 6, wherein a flow velocity ratio of said flow of said inert gas to said flow of said magnesium vapor-containing gas is in a range of 2:1 to 10:1.

8. The process as claimed in claim 1, wherein said flows of said magnesium vapor-containing gas and said inert gas are introduced into said mixing region in directions thereof intersecting each other at an angle θ of 60 degrees or less.

9. The process as claimed in claim 8, wherein a flow velocity ratio of said flow of said inert gas to said flow of said magnesium vapor-containing gas is 0.5:1 or more.

10. The process as claimed in claim 9, wherein a flow velocity ratio of said flow of the inert gas to said flow of said magnesium vapor-containing gas is 1:1 or more but less than 10:1.

11. The process as claimed in claim 8, wherein said flows of said inert gas and said magnesium vapor-containing gas generate turbulence in said flow of said mixture gas in said mixing region.

12. The process as claimed in claim 1, wherein said molecular oxygen-containing gas is air.

13. The process as claimed in claim 1, wherein said reaction mixture is heated at a temperature of 800° C. to 1600° C. in said oxidizing region.

14. The process as claimed in claim 1, wherein resultant magnesium oxide fine particles are collected by means of filtration.

15. An apparatus for producing high purity magnesium oxide fine particles, comprising:

(A) a nozzle for feeding a magnesium vapor-containing gas, having a front open end thereof and a rear end thereof connected to a supply source of said magnesium vapor-containing gas;

(B) a nozzle for feeding an inert gas, having a front open end thereof and a rear end thereof connected to a supply source of said inert gas;

(C) a mixing tube for mixing said magnesium vapor-containing gas with said inert gas therein, having a front open end thereof and a rear end thereof, into which rear end front open ends of said magnesium vapor-containing gas-feeding nozzle and said inert gas feeding nozzle are inserted, and extending over said front open ends of said magnesium vapor-containing gas-feeding nozzle and said inert gas-feeding nozzle in a concentric circular relationship to said magnesium vapor-containing gas-feeding nozzle;

(D) an oxidizing tube for oxidizing said magnesium vapor therein, having a front open end and a rear end thereof, into which rear end said front open end of the mixing tube is inserted, and extending over said front open end of said mixing tube in a concentric circular relationship to said mixing tube;

(E) a nozzle for feeding a molecular oxygen-containing gas, formed between said inserted front end portion of said mixing tube and said rear end portion of said oxidizing tube and having a front open end thereof opening to said oxidizing tube and a rear end thereof connected to a supply source of said molecular oxygen-containing gas; and (F) means for collecting said resultant magnesium oxide particles, connected to said front open end of said oxidizing tube.

16. The apparatus as claimed in claim 15, wherein said magnesium vapor-containing gas-feeding nozzle and said inert gas-feeding nozzle are in a core-in-sheath relationship in which a core nozzle of said magnesium vapor-containing gas-feeding nozzle is surrounded in a concentric circular relationship by a sheath nozzle of said inert gas-feeding nozzle.

17. The apparatus as claimed in claim 15, wherein said collecting means is provided with a filter.

* * * * *